United States Patent Office 3,022,325
Patented Feb. 20, 1962

---

3,022,325
16-FLUORINATED CORTICOSTEROIDS
Rudolph G. Berg, New London, and Gerald D. Laubach, Niantic, Conn., assignors to Chas. Pfizer & Co., Inc., Brooklyn, N.Y., a corporation of Delaware
No Drawing. Filed Nov. 2, 1959, Ser. No. 850,038
3 Claims. (Cl. 260—397.45)

The present invention relates to steroid compounds and is more particularly concerned with 16β-fluorinated corticosteroids and 21-esters thereof, to novel intermediates in the production thereof and a process for the production of the novel compounds and the novel intermediates.

This application is a continuation-in-part of our earlier filed copending United States patent application, Serial Number 801,001, filed March 23, 1959.

It has now been found that 16β-fluorinated-$\Delta^{4,6}$-pregnadienes and 16β-fluorinated-$\Delta^{1,4,6}$-pregnatrienes possess valuable anti-inflammatory, anti-rheumatoid arthritic and glucocorticoid activities to a remarkable degree. The 16β-fluorinated corticosteroids of this invention have been found to possess these valuable therapeutic activities to a much higher degree than the heretofore available 16-halogenated corticosteroids.

These compounds are also useful in the treatment of inflammatory conditions of the skin, ears, and eyes of humans and of valuable domestic animals as well as contact dermatitis and other allergic reactions. Compositions containing the valuable compounds of the present invention can be prepared for administration to humans or animals in conventional dosage forms, such as, pills, tablets, capsules, solutions, elixirs or syrups for oral use, or in liquid forms which are adaptable to the natural and synthetic cortical steroid hormones for injectable products. The novel steroids can also be administered topically in the form of ointments, creams, and the like.

The novel compounds of the present invention may be illustrated by the generic formula:

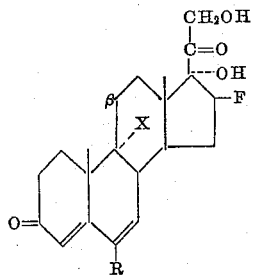

and the $\Delta^1$-dehydro analogs thereof wherein B is selected from the group consisting of carbonyl and β-hydroxymethylene radicals; X is selected from the group consisting of hydrogen, and fluorine; R is selected from the group consisting of hydrogen, fluorine, chlorine and methyl; and the 21-acylates thereof wherein the acyl radical is that of a hydrocarbon carboxylic acid containing from one to eight carbon atoms, inclusive.

The $\Delta^6$-dehydro steroid compounds of this invention can be prepared by dehydrogenation of the appropriate 3-keto-16β-fluorinated-$\Delta^4$-6,7-dihydro steroid compounds with chloranil under mild conditions according to the method set forth by Agnello and Laubach in the J. Am. Chem. Soc., 79, 1257 (1957).

The $\Delta^{1,4,6}$-pregnatriene steroid compounds of this invention are prepared by selective oxidation of the proper 3-keto-16β-fluorinated-$\Delta^{4,6}$-steroid compound by means of selenium dioxide as described by Ringold et al. in the J. Org. Chem., 21, 239 (1956), and by Florey et al. in the J. Org. Chem., 22, 406 (1957). Chloranil oxidation of the appropriate $\Delta^4$- and $\Delta^{4,6}$-steroid compounds under reaction conditions more vigorous than are utilized for the formation of $\Delta^{4,6}$-steroids also produces $\Delta^{1,4,6}$-pregnatriene steroids as is disclosed by Agnello and Laubach.

The double bond at the 1,2-positions may be introduced before or after formation of the $\Delta^6$-dehydro derivative. The specific order of steps can be transposed to suit the purposes of economics and convenience.

Suitable 3-keto-16β-fluorinated $\Delta^4$-steroids which may be utilized as reactants for the production of the dienone and trienone derivatives of this invention are prepared as described in our copending and concurrently filed patent applications Serial Nos. 850,031, now Patent No. 2,980,670; 850,032; 850,039 and 850,108. In these applications we describe the preparation of 16β-fluorinated pregnadienes, 9α,16β-difluorinated corticosteroids, 6α,16β-difluorinated corticosteroids and 6α-methylated-16β-fluorinated corticosteroids, respectively. Such materials correspond to the 6,7-dihydro analogs of compounds having the above generic formula and may be used as the 21-alcohols or 21-acylates.

The $\Delta^1$-compounds of the present invention are produced by treating the desired 3-keto-16β-fluorinated-$\Delta^4$-steroid or 3-keto-16β-fluorinated $\Delta^{4,6}$-steroid with excess selenium dioxide in a high boiling inert organic solvent, such as, phenetole, diethylene glycol diethylether, dibutyl Cellosolve, xylene, dioxane, and so forth. A tertiary organic base may be added to expedite reaction. In the preferred embodiment of this invention the steroid compound, dibutyl Cellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the product isolated by crystallization from a suitable organic solvent or by chromatography on various adsorbents.

In carrying out the process of the present invention to produce $\Delta^6$-dehydro derivatives, the selected 3-keto-16β-fluorinated $\Delta^4$-steroid or the 3-keto-16β-fluorinated-$\Delta^{1,4}$-steroid is suspended in an inert organic solvent at a temperature of between 70° C. and 190° C. and contacted with chloranil. Suitable organic solvents are t-butanol, n-amyl alcohol, hexanol, cyclohexanol, xylene, toluene, ethyl acetate. In the preferred embodiment of this invention, the reactant is suspended in xylene with from about 1 to about 6 moles of chloranil per mole of reactant, and heated to reflux for from about two to about thirty hours. The product is isolated from the reaction mixture by concentration under reduced pressure or by addition of a lower boiling organic solvent in which the product is soluble, followed by successive washings with an aqueous solution of a reducing agent, such as, sodium hydrosulfite, dilute sodium hydroxide and water. Concentration of the dried solution leaves the $\Delta^6$-dehydro compound.

When the above reaction is conducted on a 3-keto-16β-fluorinated-$\Delta^4$-steroid in n-amyl alcohol at reflux in the presence of about 3 to about 6 moles of chloranil per mole of reactant, the major product is the $\Delta^{1,4,6}$-pregnatriene compound. The use of less than about 3 moles of chloranil per mole of reactant produces the $\Delta^6$-dehydro compound as predominant product. To minimize decomposition of the reactant and product, the reaction may be conducted under an atmosphere of an inert gas, such as nitrogen.

The following examples are given by way of illustration and are not to be regarded as a limitation of this invention, many variations of which are possible without departing from its spirit or scope.

EXAMPLE I

*16β-fluoro-$\Delta^6$-dehydrohydrocortisone 21-acetate*

16β-fluoro-hydrocortisone 21-acetate (300 mg.) and chloranil (350 mg.) are added to 50 ml. of xylene and the mixture heated to reflux under an atmosphere of nitrogen for 20 hours. The reaction mixture is diluted with 100 ml. of chloroform and washed successively with several small portions of 5% sodium hydrosulfite, 5% sodium hydroxide and water. The solution is dried over anhydrous magnesium sulfate, filtered and evaporated to dryness under vacuum. The residue is triturated with ether, filtered and dried. Acid hydrolysis of the 21-acetate gives the corresponding 16β-fluoro-Δ⁶-dehydrohydrocortisone.

In like manner, the following 16β-fluorinated-Δ⁶-dehydrocorticosteroids are prepared:

16β-fluoro-Δ⁶-dehydrocortisone
9α,16β-difluoro-Δ⁶-dehydrohydrocortisone
9α,16β-difluoro-Δ⁶-dehydrocortisone
6,16β-difluoro-Δ⁶-dehydrocortisone
6,16β-difluoro-Δ⁶-dehydrohydrocortisone
6-chloro-16β-fluoro-Δ⁶-dehydrohydrocortisone
6-methyl-16β-fluoro-Δ⁶-dehydrohydrocortisone
6,9α,16β-trifluoro-Δ⁶-dehydrohydrocortisone
6,9α,16β-trifluoro-Δ⁶-dehydrocortisone
6-chloro-16β-fluoro-Δ⁶-dehydrocortisone
6-chloro-9α,16β-difluoro-Δ⁶-dehydrocortisone
6-methyl-16β-fluoro-Δ⁶-dehydrocortisone
6-methyl-9α,16β-difluoro-Δ⁶-dehydrocortisone
6-chloro-9α,16β-difluoro-Δ⁶-dehydrohydrocortisone
6-methyl-9α,16β-difluoro-Δ⁶-dehydrohydrocortisone

EXAMPLE II

*16β-fluoro-Δ$^{1,4,6}$-pregnatriene-11β,17α,21-triol-3,20-dione (chloranil oxidation)*

The process described in Example I is repeated using n-amyl alcohol in place of xylene and a 4:1 molar ratio of chloranil (780 mg.) to 16β-fluoro-hydrocortisone 21-acetate (300 mg.). The product 16β-fluoro-Δ$^{1,4,6}$-pregnatriene-11β,17α,21-triol-3,20-dione 21-acetate is isolated as described in Example I.

In like manner the following Δ$^{1,4,6}$-pregnatriene compounds are prepared:

16β-fluoro-Δ$^{1,4,6}$-pregnatriene-17α,21-diol-3,11,20-trione
9α,16β-difluoro-Δ$^{1,4,6}$-pregnatriene-11β,17α,21-triol-3,20-dione
9α,16β-difluoro-Δ$^{1,4,6}$-pregnatriene-17α,21-diol-3,11,20-trione
6,16β-difluoro-Δ$^{1,4,6}$-pregnatriene-11β,17α,21-triol-3,20-dione
6-chloro-16β-fluoro-Δ$^{1,4,6}$-pregnatriene-11β,17α,21-triol-3,20-dione
6-methyl-16β-fluoro-Δ$^{1,4,6}$-pregnatriene-11β,17α,21-triol-3,20-dione
6-chloro-16β-fluoro-Δ$^{1,4,6}$-pregnatriene-17α,21-diol-3,11,20-trione
6,9α,16β-trifluoro-Δ$^{1,4,6}$-pregnatriene-11β,17α,21-triol,3,20-dione
6-chloro-9α,16β-difluoro-Δ$^{1,4,6}$-pregnatriene-11β,17α,21-triol-3,20-dione
6-methyl-9α,16β-difluoro-Δ$^{1,4,6}$-pregnatriene-11β,17α,21-triol-3,20-dione
6,16β-difluoro-Δ$^{1,4,6}$-pregnatriene-17α,21-diol-3,11,20-trione
6,9α,16β-trifluoro-Δ$^{1,4,6}$-pregnatriene-17α,21-diol-3,11,20-trione
6-chloro-9α,16β-difluoro-Δ$^{1,4,6}$-pregnatriene-17α,21-diol-3,11,20-trione
6-methyl-16β-fluoro-Δ$^{1,4,6}$-pregnatriene-17α,21-diol-3,11,20-trione
6-methyl-9α,16β-difluoro-Δ$^{1,4,6}$-pregnatriene-17α,21-diol-3,11,20-trione

EXAMPLE III

*16β - fluoro - Δ$^{1,4,6}$ - pregnatriene - 11β,17α,21 - triol - 3,20-dione (from the corresponding 1,2-dihydro compound by selenium dioxide oxidation)*

A mixture of 16β-fluoro-Δ⁶-dehydrohydrocortisone 21-acetate (250 mg.), the product of Example I, freshly sublimed selenium dioxide (250 mg.) and 5 ml. of dibutyl Cellosolve is heated in an atmosphere of nitrogen for 20 hours. The mixture is filtered through a diatomaceous earth filter-aid and the filtrate evaporated on a Florisil (synthetic magnesium silicate) column. Acid hydrolysis of the thus obtained product according to known procedures produces 16β-fluoro-Δ$^{1,4,6}$-pregnatriene-11β,17α,21-triol-3,20-dione identical to the product of Example II.

In like manner, the following Δ$^{1,4,6}$-pregnatriene derivatives are prepared from the products of Example I. In every instance, they are identical to the corresponding products of Example II.

16β-fluoro-Δ$^{1,4,6}$-pregnatriene-17α,21-diol-3,11,20-trione
9α,16β-difluoro-Δ$^{1,4,6}$-pregnatriene-11β,17α,21-triol-3,20-dione
6,16β-difluoro-Δ$^{1,4,6}$-pregnatriene-11β,17α,21-triol-3,20-dione
6-chloro-16β-fluoro-Δ$^{1,4,6}$-pregnatriene-11β,17α,21-triol-3,20-dione
6-methyl-16β-fluoro-Δ$^{1,4,6}$-pregnatriene-11β,17α,21-triol-3,20-dione
6,9α,16β-trifluoro-Δ$^{1,4,6}$-pregnatriene-11β,17α,21-triol-3,20-dione

EXAMPLE IV

A variety of esters of the Δ$^{4,6}$- and Δ$^{1,4,6}$-16β-fluorinated corticosteroid products are prepared using acyl chlorides or acyl anhydrides as acylating agents in accordance with conventional methods. These include such esters as the formate, the propionate, the isobutyrate, the hexanoate, octanoate, the benzoate and the succinate.

What is claimed is:

1. A compound selected from the group consisting of those having formulae:

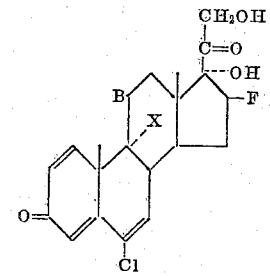

and

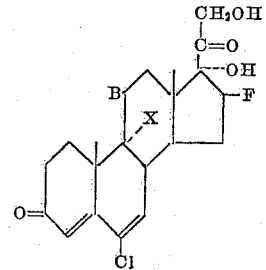

wherein B is selected from the group consisting of carbonyl and β-hydroxymethylene radicals and X is selected from the group consisting of hydrogen and fluorine; and the 21-acylates thereof wherein the acyl radical is that of a hydrocarbon carboxylic acid containing from one to eight carbon atoms, inclusive.

2. 6 - chloro - 16β - fluoro - Δ$^{1,4,6}$ - pregnatriene - 11β,17α,21-triol-3,20-dione.

3. 6 - chloro - 16β - fluoro - Δ$^{1,4,6}$ - pregnatriene - 11β,17α,21-triol-3,20-dione-21-acetate.

(References on following page)

References Cited in the file of this patent

UNITED STATES PATENTS 2,781,366  Schneider _____ Feb. 12, 1957
2,882,282  Agnello et al. _____ Apr. 14, 1959

OTHER REFERENCES

Bowers et al.: "J.A.C.S." (1958), vol. 80, p. 3091 relied on.
Edwards et al.: "J.A.C.S." (1959), vol. 81, p. 3157 relied on.

UNITED STATES PATENT OFFICE
CERTIFICATE OF CORRECTION

Patent No. 3,022,325            February 20, 1962

Rudolph G. Berg et al.

It is hereby certified that error appears in the above numbered patent requiring correction and that the said Letters Patent should read as corrected below.

Column 4, line 5, for "evaporated" read -- chromatographed --.

Signed and sealed this 26th day of June 1962.

(SEAL)
Attest:

ERNEST W. SWIDER
Attesting Officer

DAVID L. LADD
Commissioner of Patents